US012476386B2

(12) United States Patent
Tian et al.

(10) Patent No.: US 12,476,386 B2
(45) Date of Patent: Nov. 18, 2025

(54) MULTI-BAND MULTI-FEED PATCH ANTENNA AND USER EQUIPMENT COMPRISING THE SAME

(71) Applicant: Huawei Technologies Co., Ltd., Shenzhen (CN)

(72) Inventors: Ruiyuan Tian, Helsinki (FI); Weibo Peng, Shenzhen (CN); Lin Yuan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 18/690,617

(22) PCT Filed: Sep. 10, 2021

(86) PCT No.: PCT/CN2021/117776
§ 371 (c)(1),
(2) Date: Mar. 8, 2024

(87) PCT Pub. No.: WO2023/035239
PCT Pub. Date: Mar. 16, 2023

(65) Prior Publication Data
US 2025/0233320 A1 Jul. 17, 2025

(51) Int. Cl.
*H01Q 1/38* (2006.01)
*H01Q 9/04* (2006.01)
*H01Q 21/06* (2006.01)
*H01Q 21/08* (2006.01)

(52) U.S. Cl.
CPC ............. *H01Q 21/065* (2013.01); *H01Q 1/38* (2013.01); *H01Q 9/0407* (2013.01); *H01Q 21/08* (2013.01)

(58) Field of Classification Search
CPC ............ H01Q 1/08; H01Q 1/38; H01Q 1/243; H01Q 5/48; H01Q 9/045; H01Q 9/0414; H01Q 21/24; H01Q 21/065
See application file for complete search history.

(56) References Cited

U.S. PATENT DOCUMENTS

| | | | | |
|---|---|---|---|---|
| 7,773,035 B2 * | 8/2010 | Murata | .................... | H01Q 3/24 343/702 |
| 7,864,117 B2 * | 1/2011 | Aurinsalo | ............ | H01Q 9/0435 343/702 |
| 8,508,426 B2 * | 8/2013 | Honda | ................... | H01Q 3/446 343/834 |

(Continued)

FOREIGN PATENT DOCUMENTS

| | | |
|---|---|---|
| CN | 111509403 A | 8/2020 |
| KR | 102258794 B1 | 5/2021 |

*Primary Examiner* — Tung X Le
(74) *Attorney, Agent, or Firm* — Slater Matsil, LLP

(57) ABSTRACT

Embodiments relate to patch antennas and devices utilizing patch antennas. Some embodiments comprise at least two different arrays of conductive patches arranged on one side of a dielectric substrate. Each of the at least two arrays of conductive patches supports a different frequency band. Moreover, each of the at least two arrays of conductive patches is provided with separated feeding. Additionally, each conductive patch of one or more of the at least two arrays of conductive patches is implemented as a combination two conductive sub-patches separated by a gap. In some embodiments, the patch antenna is suitable for integration into a display structure of a UE or other device.

20 Claims, 15 Drawing Sheets

(56) References Cited

U.S. PATENT DOCUMENTS

| | | | | |
|---|---|---|---|---|
| 10,476,149 | B1 * | 11/2019 | Ueda | H01Q 21/08 |
| 11,355,831 | B2 * | 6/2022 | Xia | H01Q 3/38 |
| 2016/0093939 | A1 | 3/2016 | Kim et al. | |
| 2019/0081414 | A1 | 3/2019 | Kao et al. | |
| 2023/0411869 | A1 * | 12/2023 | Jang | H01Q 5/378 |

* cited by examiner

MULTI-BAND MULTI-FEED PATCH ANTENNA AND USER EQUIPMENT COMPRISING THE SAME

CROSS-REFERENCE TO RELATED APPLICATIONS

This application is a National Stage of International Application No. PCT/CN2021/117776, filed on Sep. 10, 2021, which is hereby incorporated by reference in its entirety.

TECHNICAL FIELD

The disclosure relates generally to patch antennas, and more particularly to a patch antenna that is configured to support multiple frequency bands and use separated feeding to operate in the frequency bands, as well as to a user equipment (UE) comprising such a patch antenna.

BACKGROUND

More and more radio technologies need to be supported in a UE. These technologies may include cellular technologies, such as second generation (2G), third generation (3G), or fourth generation (4G) radio, as well as non-cellular technologies. In the forthcoming fifth generation (5G) new radio (NR) technology, an operational frequency range will be expanded from the so-called sub-6 GHz to millimeter-wave (mmWave) frequencies, e.g., between 20 GHz and 70 GHz. At the mmWave frequencies, an antenna array installed in the UE is required to form a beam with a higher gain to overcome a higher path loss in a propagation media. However, an antenna radiation pattern and beam pattern with a higher gain will result in a narrow beam width. Therefore, a beam steering technique may be utilized to steer the beam towards a different direction on demand.

More specifically, the UE should use omnidirectional-coverage (omnicoverage) mmWave antennas with generally constant Equivalent Isotropic Radiated Power (EIRP)/Equivalent Isotropic Sensitivity (EIS), diversity/Multiple Input Multiple Output (MIMO) performance to achieve stable communication in all directions and orientations. Requirements for omnicoverage may be defined by Enhanced Mobile Broadband (eMBB) dense urban use-cases, where there is a high probability for Line-of-Sight (LoS) towards the UE. Therefore, dual polarization should be necessary to ensure good performance.

Conventionally, a mmWave antenna is implemented as an antenna module. The antenna module may be then integrated into a main circuit board of the UE. However, the integration of such an antenna module (together with a Radio Frequency Integrated Circuit (RFIC) used for feeding the antenna module) into small-sized UEs, such as a mobile phone, is a challenging task due to the limited interior UE space available.

SUMMARY

This summary is provided to introduce a selection of concepts in a simplified form that are further described below in the detailed description. This summary is not intended to identify key features of the disclosure, nor is it intended to be used to limit the scope of the disclosure.

It is an objective of the disclosure to provide a technical solution that allows a patch antenna to operate in multiple frequency bands, while using separated feeding (e.g., via a RFIC) for each of the frequency bands.

The objective above is achieved by the features of the independent claim in the appended claims. Further embodiments and examples are apparent from the dependent claims, the detailed description and the accompanying drawings.

According to a first aspect, a patch antenna apparatus is provided. The patch antenna comprises a dielectric substrate, a first array of conductive patches, and a second array of conductive patches. The first array of conductive patches is arranged on the dielectric substrate and has a first inter-patch spacing that corresponds to a first frequency band. Each conductive patch of the first array of conductive patches comprises a feed terminal. The second array of conductive patches is arranged adjacent to the first array of conductive patches on the dielectric substrate and has a second inter-patch spacing. The second inter-patch spacing corresponds to a second frequency band that is different from the first frequency band. Each conductive patch of the second array of conductive patches comprises a first conductive sub-patch and a second conductive sub-patch that is separated from the first conductive sub-patch by a gap. Each of the first conductive sub-patches comprises a feed terminal. The gap defines a bandwidth of the second frequency band. In this configuration, the patch antenna may support different (i.e., first and second) frequency bands. Moreover, this configuration of the patch antenna allows one to individually design the size of each patch, as well as the inter-patch spacing for each of the first and second frequency bands. In this way, the half-wavelength requirement of both frequency bands may be best fulfilled. Furthermore, by implementing the gap between the first and second sub-patches of each conductive patch of the second array of conductive patches, it is possible to obtain two frequency resonances around an operating frequency selected from the second frequency band, thus enlarging an operating frequency bandwidth. In other words, the gap size defines how close or far apart the two frequency resonances are.

In one embodiment of the first aspect, each conductive patch of the first array of conductive patches is square-shaped. By using the square-shaped conductive patches, it is possible to provide their close-packed arrangement in a UE (e.g., a mobile phone).

In one embodiment of the first aspect, the first conductive sub-patch of each conductive patch of the second array of conductive patches has a first size (e.g., area, diameter, etc.), and the second conductive sub-patch of each conductive patch of the second array of conductive patches has a second size. In this embodiment, the first size is equal to or smaller than the second size. By making the first size equal to or smaller than the second size, it is possible to change the electromagnetic coupling between the first and second sub-patches of each conductive patch of the second array of conductive patches, thereby also decreasing or increasing the operating frequency bandwidth (i.e., the separation between the two frequency resonances).

In one embodiment of the first aspect, the first conductive sub-patch and the second conductive sub-patch of each conductive patch of the second array of conductive patches is square-shaped. By using the square-shaped conductive sub-patches, it is possible to provide their close-packed arrangement in the UE.

In one embodiment of the first aspect, the first conductive sub-patch of each conductive patch of the second array of conductive patches is T-shaped, and the second conductive sub-patch of each conductive patch of the second array of conductive patches is square-shaped. By using the T-shaped first sub-patch in combination with the square-shaped second sub-patch, it is possible to increase the operating frequency bandwidth and achieve a good broadside radiation across the entire second frequency band.

In one embodiment of the first aspect, the feed terminal of each conductive patch of the first array of conductive patches is a microstrip or a coplanar waveguide. By using such microstrips or coplanar waveguide, it is possible to improve the antenna functionality.

In one embodiment of the first aspect, the feed terminal of the first conductive sub-patch of each conductive patch of the second array of conductive patches is a microstrip or a coplanar waveguide. By using such microstrips or coplanar waveguide, it is possible to improve the antenna functionality.

In one embodiment of the first aspect, the dielectric substrate is an optically transparent film. In this embodiment, each conductive patch in each of the first array of conductive patches and the second array of conductive patches has a mesh structure. By using the dielectric substrate that is optically invisible to a UE user in concert with the meshed conductive patches, it is possible to integrate the whole patch antenna into the display structure of the UE, thereby implementing the so-called "antenna-on-display" design. This allows the display surface to be used, among others, for signal reception and transmission.

In one embodiment of the first aspect, the mesh structure has a unit cell, and the feed terminal of each conductive patch of the first array of conductive patches has a width equal to at least one unit cell of the mesh structure, and the feed terminal of the first conductive sub-patch of each conductive patch of the second array of conductive patches has a width equal to the at least one unit cell of the mesh structure. By using such feed terminals, it is possible to improve the antenna functionality.

In one embodiment of the first aspect, the unit cell of the mesh structure is polygonal-shaped. By using this shape of the unit cell and properly selecting the size of the unit cell, it is possible to avoid the so-called "moire-effect", which will occur when placing a periodical pattern over a light emitting display.

In one embodiment of the first aspect, each conductive patch of the first array of conductive patches is arranged between two neighboring conductive patches of the second array of conductive patches. By so doing, it is possible to provide the close-packed arrangement of the first and second arrays of conductive patches in the UE.

In one embodiment of the first aspect, the patch antenna further comprises an electromagnetic band-gap (EBG) structure formed on the dielectric substrate around the first array of conductive patches and the second array of conductive patches. By using the EBG structure, it is possible to reduce the beam distortion caused by surface waves.

In one embodiment of the first aspect, the EBG structure is implemented as a metal mesh having a square unit cell. This meshed EBG structure is easy to implement on any side of the UE. Moreover, by changing the size (area) of the square unit cell, it is possible to determine at which frequency the EBG structure functions as a high impedance surface, so that the surface waves are depressed.

In one embodiment of the first aspect, the first inter-patch spacing is equal to an average half-wavelength for frequencies from the first frequency band, and the second inter-patch spacing is equal to an average half-wavelength for frequencies from the second frequency band. By selecting such first and second inter-patch spacings, it is possible to improve the antenna functionality in the first and second frequency bands.

In one embodiment of the first aspect, one half of the first array of conductive patches is oriented in a first direction, and another half of the first array of conductive patches is oriented in a second direction that is different from the first direction. At the same time, one half of the second array of conductive patches is oriented in the first direction, and another half of the second array of conductive patches is oriented in the second direction. By orienting the conductive patches of each of the first and second arrays of conductive patches in the two directions, it is possible to implement the dual-polarized patch antenna.

In one embodiment of the first aspect, the patch antenna further comprises a third array of array of conductive patches arranged adjacent to the first array of conductive patches and the second array of conductive patches on the dielectric substrate. The third inter-patch spacing corresponds to a third frequency band that is different from the first frequency band and the second frequency band. Each conductive patch of the third array of conductive patches comprises a feed terminal. Thus, the number of the frequency bands supported by the patch antenna may be increased, if required and depending on particular applications.

In one embodiment of the first aspect, one half of the third array of conductive patches is oriented in the first direction, and another half of the third array of conductive patches is oriented in the second direction. In this case, the patch antenna may also provide dual polarization in the third frequency band.

In one embodiment of the first aspect, each conductive patch of the third array of conductive patches has a mesh structure having a polygonal-shaped unit cell. In this embodiment, the feed terminal of each conductive patch of the third array of conductive patches has a width equal to at least one polygonal-shaped unit cell of the mesh structure. By using such meshed conductive patches and by properly selecting the size of the polygonal-shaped unit cell, it is possible to avoid the so-called "moire-effect" when the third array of conductive patches is arranged on or integrated into the display of the UE. Moreover, by using such a width of each feed terminal, it is possible to improve the antenna functionality.

In one embodiment of the first aspect, the third inter-patch spacing is equal to an average half-wavelength for frequencies from the third frequency band. By selecting such a third inter-patch spacing, it is possible to improve the antenna functionality in the third frequency band.

According to a second aspect, a UE for wireless communications is provided. The UE comprises the patch antenna according to the first aspect, a processing unit, a flexible printed circuit board (PCB), and a storage unit. The flexible PCB comprises a set of microstrips or a set coplanar waveguides that are configured to couple the processing unit to the feed terminals of the patch antenna. The storage unit is coupled to the processing unit and stores processor-executable instructions. When executed by the processing unit, the processor-executable instructions cause the processing unit to perform wireless communications (e.g., with another UE) by using the patch antenna. By using such a patch antenna, the UE may operate in at least two different frequency bands. Moreover, the flexible PCB may enable different arrangements of the patch antenna in the UE, and its microstrips or coplanar waveguides may provide better antenna feeding (separated for each of the at least two frequency bands) and antenna functionality.

In one embodiment of the second aspect, the UE further comprises a display. In this embodiment, the patch antenna is arranged on the display provided that the dielectric substrate of the patch antenna is implemented as the optically transparent film and each conductive patch of the patch antenna has the mesh structure. By using such a patch antenna, it is possible to avoid the so-called "moire-effect", as well as to use the display surface, among others, for signal reception and transmission.

Other features and advantages of the disclosure will be apparent upon reading the following detailed description and reviewing the accompanying drawings.

BRIEF DESCRIPTION OF THE DRAWINGS

The disclosure is explained below with reference to the accompanying drawings in which.

DETAILED DESCRIPTION OF ILLUSTRATIVE EMBODIMENTS

Figure 1:
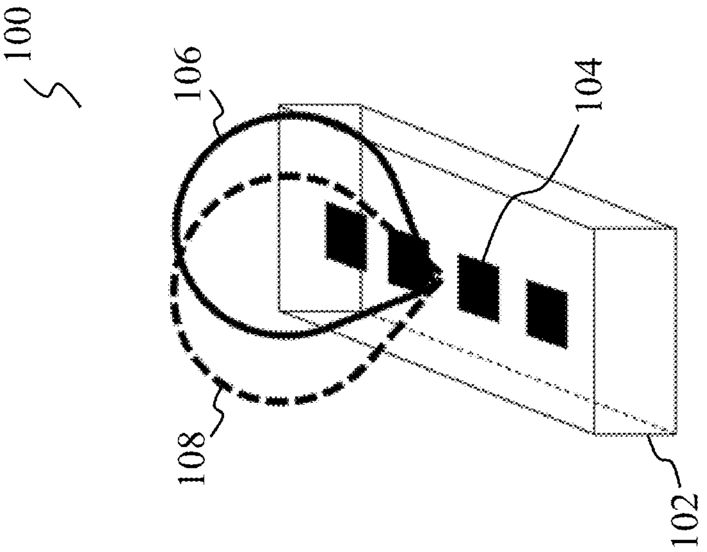
FIG. 1 (Prior art)
FIG. 1 shows a block diagram of a patch antenna in accordance with the prior art.

Various embodiments of the disclosure are further described in more detail with reference to the accompanying drawings. However, the disclosure may be embodied in many other forms and should not be construed as limited to any certain structure or function discussed in the following description. In contrast, these embodiments are provided to make the description of the disclosure detailed and complete.

According to the detailed description, it will be apparent to the ones skilled in the art that the scope of the disclosure encompasses any embodiment thereof, which is disclosed herein, irrespective of whether this embodiment is implemented independently or in concert with any other embodiment of the disclosure. For example, the apparatuses disclosed herein may be implemented in practice by using any numbers of the embodiments provided herein. Furthermore, it should be understood that any embodiment of the disclosure may be implemented using one or more of the features presented in the appended claims.

The word "exemplary" is used herein in the meaning of "used as an illustration". Unless otherwise stated, any embodiment described herein as "exemplary" should not be construed as preferable or having an advantage over other embodiments.

Any positioning terminology, such as "left", "right", "top", "bottom", "above" "below", "upper", "lower", "horizontal", "vertical", etc., may be used herein for convenience to describe one element's or feature's relationship to one or more other elements or features in accordance with the figures. It should be apparent that the positioning terminology is intended to encompass different orientations of the apparatus disclosed herein, in addition to the orientation(s) depicted in the figures. As an example, if one imaginatively rotates the apparatus in the figures 90 degrees clockwise, elements or features described as "left" and "right" relative to other elements or features would then be oriented, respectively, "above" and "below" the other elements or features. Therefore, the positioning terminology used herein should not be construed as any limitation of the disclosure.

Although the numerative terminology, such as "first", "second", "third", "fourth", etc., may be used herein to describe various embodiments and features, it should be understood that these embodiments and features should not be limited by this numerative terminology. This numerative terminology is used herein only to distinguish one feature or embodiment from another feature or embodiment. For example, a first array of conductive patches and a second array of conductive patches which are discussed below could be renamed a second array of conductive patches and a first array of conductive patches, respectively, without departing from the teachings of the disclosure.

As used in the embodiments disclosed herein, a patch antenna may refer to a plurality of discrete planar radiating elements mounted on one side of a dielectric substrate. Another (opposite) side of the dielectric substrate may be coated with a continuous conductive layer functioning as a ground plane of the patch antenna. The discrete planar radiating elements are also referred to as conductive patches. In some embodiments, each conductive patch may be made of a metal or metal alloy. In other embodiments, each conductive patch may be made of non-metallic electrical conductors, such as superconductors. Thus, the conductive patches used in the embodiments disclosed herein should be construed as relating to metallic and non-metallic electrical conductors. The conductive patch may take various geometric shapes, such as square, rectangular, circular, triangular, elliptical, dipole, etc. The square, rectangular, and circular shapes of the conductive patch are most common due to the ease of their analysis, design, and fabrication.

Radio signals radiated and received by the conductive patches may refer to a type of electromagnetic radiation that occurs in the so-called centimeter-wave (cmWave) and millimeter-wave (mmWave) bands. The radio signals have been used, for example, in wireless communications, such as point-to-point communications, intersatellite links, and point-to-multipoint communications, etc. However, the application of the radio signals is not limited to wireless communications only, and they may be also used, for example, for (air, ground or marine) vehicle navigation and control, road obstacle detection, etc. For this reason, the patch antenna according to the embodiments disclosed herein may be used in the same use scenarios as the radio signals.

More specifically, the patch antenna may be implemented as part of a user equipment (UE) that may refer to a mobile device, a mobile station, a terminal, a subscriber unit, a mobile phone, a cellular phone, a smart phone, a cordless phone, a personal digital assistant (PDA), a wireless communication device, a desktop computer, a laptop computer, a tablet computer, a single-board computer (SBC) (e.g., a Raspberry Pi device), a quantum computer, a gaming device, a netbook, a smartbook, an ultrabook, a medical device or medical equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable device that uses the radio waves for operation. In some embodiments, the UE may refer to at least two collocated and inter-connected UEs thus defined.

FIG. 1 shows a block diagram of a patch antenna 100 in accordance with the prior art. The patch antenna 100 is implemented as a module to be integrated into a UE (e.g., a mobile phone). The patch antenna 100 comprises a dielectric substrate 102 and an array of square-shaped conductive patches 104 arranged on one side of the dielectric substrate 102. As noted earlier, there may be a ground plane (not shown in FIG. 1) formed on another (bottom) side of the patch antenna 100 which is opposite to the side with the conductive patches 104. The conductive patches 104 may be oriented differently. For example, one part of the conductive patches 104 may be oriented in a first direction to radiate radio signal with a first polarization 106, while another part of the conductive patches 104 may be oriented in a different second direction to radiate radio signals with a different second polarization 108. Thus, the patch antenna 100 may be implemented as a dual-polarized antenna. For example, a dual-polarized antenna radiation may be required where each of the polarizations 106 and 108 is utilized by an independent data stream of a baseband modem to facilitate MIMO communications.

Figure 2:
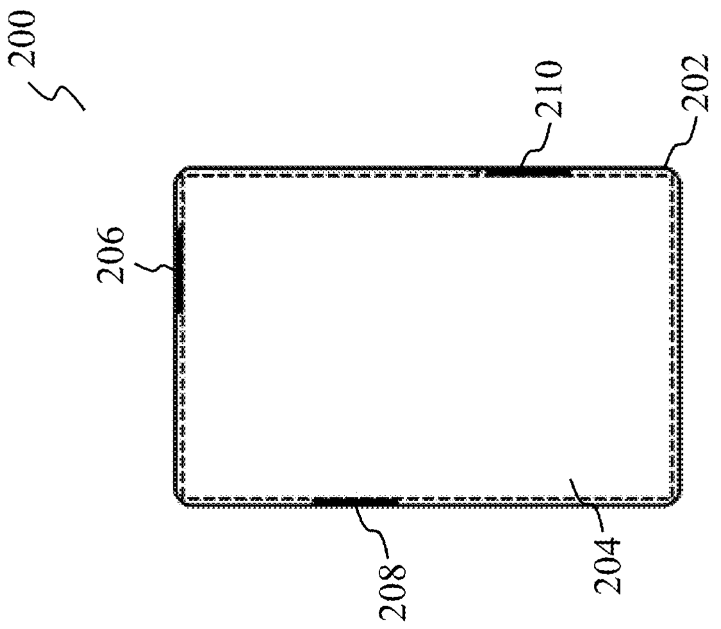
FIG. 2 (Prior art)
FIG. 2 shows a block diagram of a UE with one possible patch-antenna arrangement in accordance with the prior art.

FIG. 2 shows a block diagram of a UE 200 with one possible patch-antenna arrangement in accordance with the prior art. The UE 200 is assumed to be a mobile phone comprising a housing 202 and a display 204. The UE 200 further comprises three patch antenna 206, 208, and 210, each of which may be implemented as the patch antenna 100. More specifically, the patch antenna 206 is arranged at the top edge of the housing 202, the patch antenna 208 is arranged at the left edge of the housing 202, and the patch antenna 210 is arranged at the right edge of the housing 202. Such an arrangement of the patch antennas 206, 208, and 210 is required to sufficiently cover as much of the sphere around the UE 200 as possible. However, the coverage provided by the patch-antenna arrangement shown in FIG. 2 does not include a frontside direction, i.e., from the display 204 towards free space. The UE 200 may additionally comprise an RFIC (not shown in FIG. 2) configured to feed each of the patch antennas 206, 208, and 210.

Figure 3:
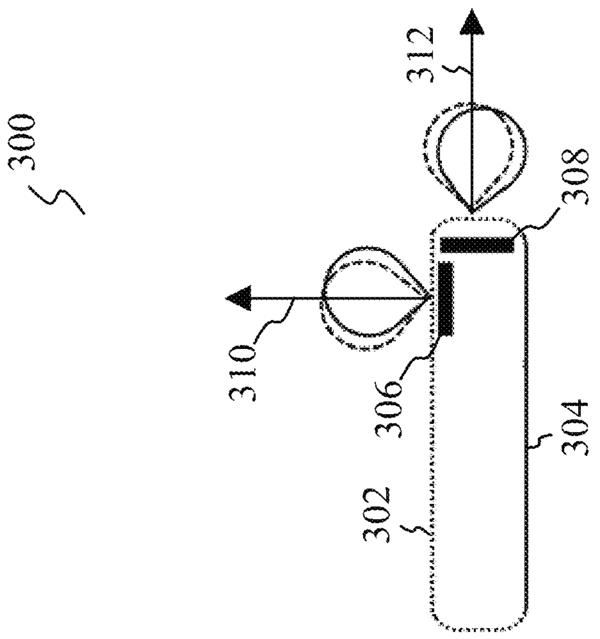
FIG. 3 (Prior art)
FIG. 3 shows a block diagram of a UE with another possible patch-antenna arrangement in accordance with the prior art.

FIG. 3 shows a block diagram of a UE 300 with another possible patch-antenna arrangement in accordance with the prior art. The UE 300 is again assumed to be a mobile phone comprising a housing 302 and a display 304. The UE 300 further comprises two patch antennas 306 and 308, each of which may be implemented as the patch antenna 100 shown in FIG. 1. The patch antennas 306 and 308 are both installed inside the housing 302 such that the patch antenna 306 provides a dual-polarized radiation in a backside direction 310, i.e., perpendicular to the housing 302 (as well as the display 304) of the UE 300, while the patch antenna 308 provides a dual-polarized radiation in an end-fire direction 312, i.e., parallel to the display 304 of the UE 300. The patch antennas 306 and 308 may be also fed by using a RFIC (not shown in FIG. 3) included in the UE 300. Alternatively, the RFIC and each of the antenna 306 and 308 may be integrated in a single package.

As follows from FIGS. 2 and 3, a number of patch antennas (e.g., like the patch antenna 100) may be placed at different locations of the UE (e.g., the mobile phone). However, the integration of such patch antennas and such an RFIC into the mobile phone is challenging due to the limited space available inside the mobile phone. Furthermore, the current patch antennas are difficult or even impossible to integrate into the display structure of the mobile phone. In the meantime, such an antenna-on-display design would allow one to use a frontside direction radiation (i.e., the radiation directed from the display towards free space or, with reference to FIG. 3, opposite the backside direction 310), thereby enhancing beam coverage and, consequently, link performance and user experience.

The exemplary embodiments disclosed herein provide a technical solution that allows mitigating or even eliminating the above-sounded drawbacks peculiar to the prior art. In particular, the exemplary embodiments disclosed herein provide a patch antenna comprising at least two different arrays of conductive patches arranged on one side of a dielectric substrate. Each of the at least two arrays of conductive patches supports a different frequency band. Moreover, each of the at least two arrays of conductive patches is provided with separated feeding. Additionally, each conductive patch of one or more of the at least two arrays of conductive patches (e.g., the array(s) of conductive patches intended for low frequencies) is implemented as a combination two conductive sub-patches separated by a gap, which allows one to define an appropriate operating frequency bandwidth. This configuration of the patch antenna also allows one to individually design the size of each conductive patch, as well as an inter-patch spacing for each of the frequency bands under consideration. In one embodiment, the patch antenna is suitable for integration into a display structure of a UE, thereby making it possible to use a frontside direction radiation.

Figure 4:
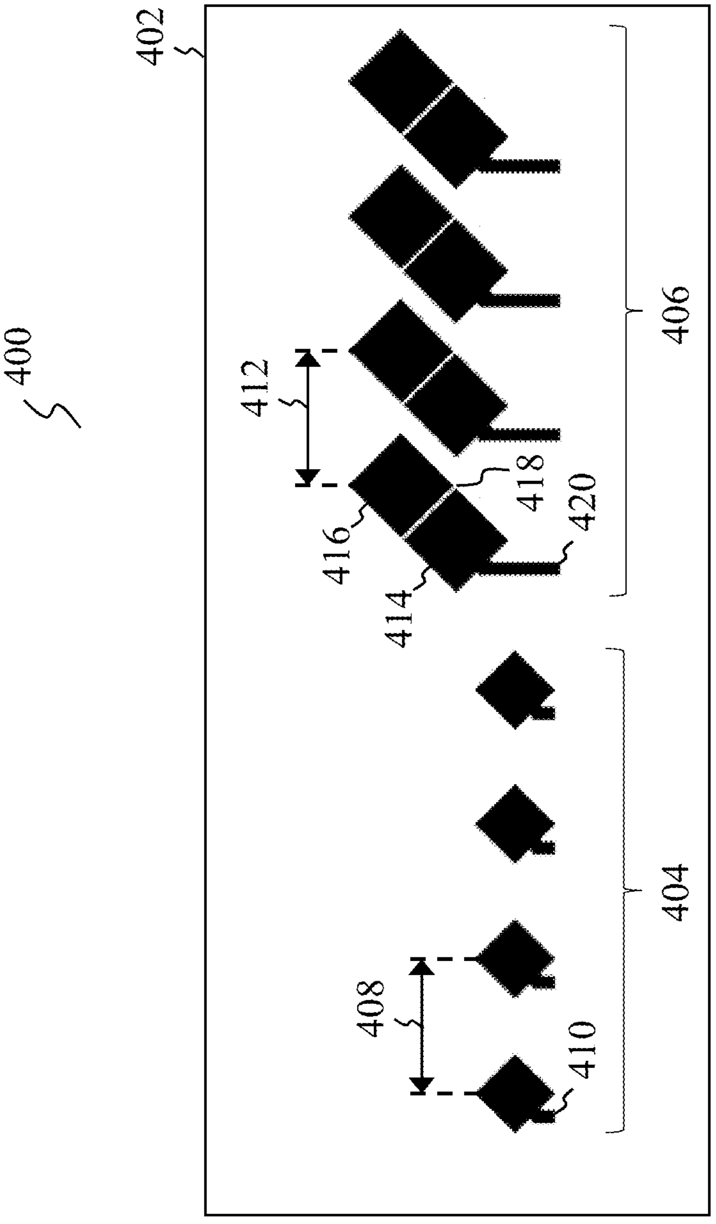
FIG. 4 shows a block diagram of a patch antenna in accordance with a first exemplary embodiment.

FIG. 4 shows a block diagram of a patch antenna 400 in accordance with a first exemplary embodiment. The patch antenna 400 may be part of any of the above-mentioned UEs (e.g., a mobile phone). As shown in FIG. 4, the patch antenna 400 comprises the following constructive elements: a dielectric substrate 402, a first array 404 of conductive patches, and a second array 406 of conductive patches.

The first array 404 of conductive patches is arranged on the dielectric substrate 402 and has a first inter-patch spacing 408 that corresponds to a first frequency band. If the first frequency range varies from about 37 GHz to about 44 GHz, radio signal wavelengths vary from about 6.8 mm to about 8.1 mm (provided that radio signals propagate at the speed of light), and the first inter-patch spacing 408 may be equal to one of these wavelengths. Alternatively, the first inter-patch spacing 408 may be equal to an average half-wavelength for the frequencies from the first frequency band (e.g., the first inter-patch spacing may be equal to about 3.75 mm provided that the first frequency band is from 37 GHz to 44 GHz). Each conductive patch of the first array 404 of conductive patches comprises a feed terminal 410.

The second array 406 of conductive patches is arranged adjacent to the first array 404 of conductive patches on the dielectric substrate 402 and has a second inter-patch spacing 412. The second inter-patch spacing 412 corresponds to a second frequency band that is different from the first frequency band. In particular, the second frequency band comprises frequencies smaller than those of the first frequency band. In this sense, the first frequency band is a high-frequency band, while the second frequency band is a low-frequency band. If the second frequency range varies from about 24 GHz to about 30 GHz, the radio signal wavelengths vary from about 10 mm to about 12.5 mm (provided that radio signals propagate at the speed of light), and the second inter-patch spacing 412 may be equal to one of these wavelengths or their average half-wavelength (i.e., about 5.6 mm). Unlike the first array 404 of conductive patches, each conductive patch of the second array 406 of conductive patches comprises a first conductive sub-patch 414 and a second conductive sub-patch 416 that is separated from the first conductive sub-patch 414 by a gap 418. This is done to overcome a more severe bandwidth challenge peculiar to low-frequency bands. The gap 418 may vary from the range of 50 μm to 200 μm. Each of the first conductive sub-patches 414 comprises a feed terminal 420. The feed terminals 410 and 420 may be implemented as microstrips or coplanar waveguides.

It should be noted that the above-given possible numerical values of the first and second inter-patch spacings are based on free-space wavelengths. If one calculates them, for example, in a substrate or other medium with a dielectric constant (DK) higher than 1, their values will be scaled by 1/sqrt (DK) (where "sqrt" is the square root), i.e., the numerical values of the first and second inter-patch spacings will be smaller.

Additionally, if required, the dielectric substrate 402 may be provided with a ground plane on the side opposite to that with the first array 404 of conductive patches and the second array 406 of conductive patches.

As for the sizes of the two sub-patches 414 and 416 and the gap 418, they define the amount of electromagnetic (EM) coupling between the first sub-patch 414 and the second sub-patch 416. The presence of the two gap-separated sub-patches 414 and 416 result into two frequency resonances around an operating frequency selected from the second frequency band, thereby increasing an operating frequency bandwidth. The amount of the EM coupling may be considered as a measure for determining how close or far apart the two frequency resonances are. In other words, the gap 418 and the two sub-patches 414 and 416 should be sized such that a desired operating frequency bandwidth is obtained for the low-frequency band.

As used in the embodiments disclosed herein, the size of a conductive patch (or sub-patch) should be construed as a parameter that allows one to determine how big the conductive patch (or sub-patch) is. This parameter may be expressed differently depending on the shape of the conductive patch (or sub-patch). More specifically, if the conductive patch (or sub-patch) is circular-shaped, its size may be represented by a diameter (that allows one to calculate a circular area occupied by the conductive patch (or sub-patch)); if the conductive patch (or sub-patch) is square-shaped, its size may be represented by a length of a square side (that allows one to calculate an area occupied by the square-shaped conductive patch (or sub-patch)); and so on. For example, in case of the square-shaped conductive patches, the square side may be equal to 2 mm.

Although each of the first array 404 of conductive patches and the second array 406 of conductive patches comprises only four conductive patches, this number of the conductive patches is shown in FIG. 4 for illustrative purposes only and should not be construed as any limitation of the disclosure. The same is also true for the square shape of each conductive patch shown in FIG. 4. In general, the number, shape, and arrangement of the conductive patches, which are shown in FIG. 4, are merely used to provide a general idea of how the conductive patches may be provided on the dielectric substrate 402. For example, each of the first array 404 of conductive patches and the second array 406 of conductive patches may have a different (even or odd) number of conductive patches, and/or the first array 404 of conductive patches and the second array 406 of conductive patches may differ from each other in the shape and/or orientation of their conductive patches.

Alternatively or additionally, each conductive patch of the first array 404 of conductive patches may be also implemented as a combination of two conductive sub-patches separated by a gap, like the conductive sub-patches 414 and 416 separated by the gap 418. In this case, the gap and the sizes of the sub-patches of the first array 404 of conductive patches will be defined based on the first frequency band. However, in practice, the bandwidth requirement for low-frequency bands (to which the second frequency band is assumed to belong) is relatively higher than for high-frequency bands (to which the first frequency band is assumed to belong). Thus, a desired bandwidth for the first frequency band may be sufficiently achieved without having to divide each conductive patch of the first array 404 of conductive patches into gap-separated sub-patches.

Figure 5:
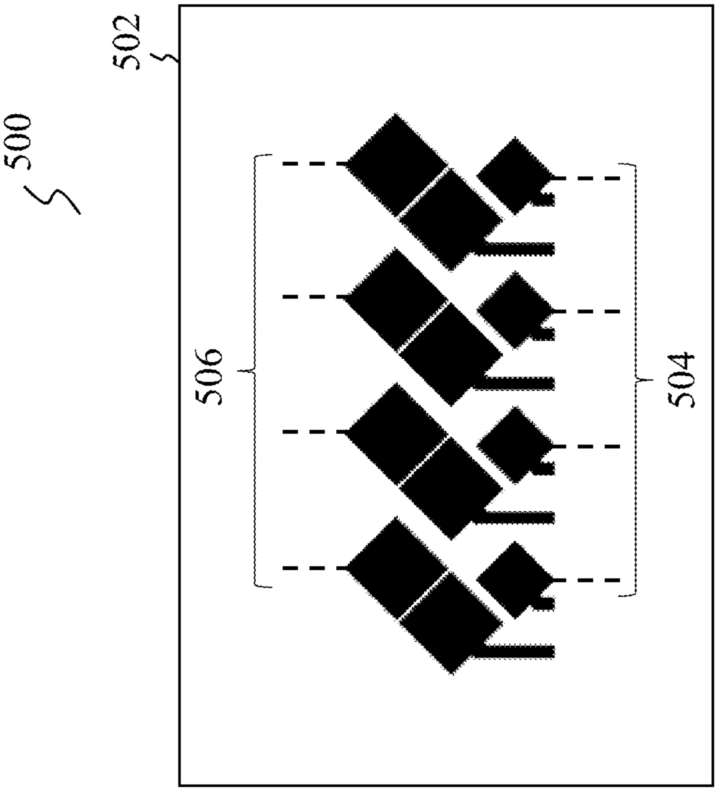
FIG. 5 shows a block diagram of a patch antenna in accordance with a second exemplary embodiment.

FIG. 5 shows a block diagram of a patch antenna 500 in accordance with a second exemplary embodiment. Similar to the patch antenna 400, the patch antenna 500 may be part of any of the above-mentioned UEs (e.g., a mobile phone). As shown in FIG. 5, the patch antenna 500 comprises the following constructive elements: a dielectric substrate 502, a first array 504 of conductive patches, and a second array 506 of conductive patches. The dashed lines shown in FIG. 5 are used to show which of the conductive patches belong to which of the first array 504 of conductive patches and the second array 506 of conductive patches. More specifically, it is again shown that each of the first array 504 of conductive patches and the second array 506 of conductive patches comprises only four conductive patches. The inter-patch spacing of the first array 504 of conductive patches is different from that of the second array 506 of conductive patches. The conductive patches of the first array 504 of conductive patches are implemented similar to those of the first array 404 of conductive patches, while the conductive patches of the second array 506 of conductive patches are implemented similar to those of the second array 406 of conductive patches. At the same time, unlike the patch antenna 400, the patch antenna 500 is implemented such that each conductive patch of the first array 504 of conductive patches is arranged between two neighboring conductive patches of the second array 506 of conductive patches. For example, each inter-patch spacing of the second array 506 of conductive patches may comprise one conductive patch of the first array 504 of conductive patches. In other words, the conductive patches of the first array 504 of conductive patches and the second array 506 of conductive patches may be arranged alternately in line, while maintaining the inter-patch spacing of the first array 504 of conductive patches and the inter-patch spacing of the second array 506 of conductive patches, respectively. By so doing, it is possible to provide the close-packed arrangement of the conductive patches in the patch antenna 500 and, consequently, in the UE.

Figure 6:
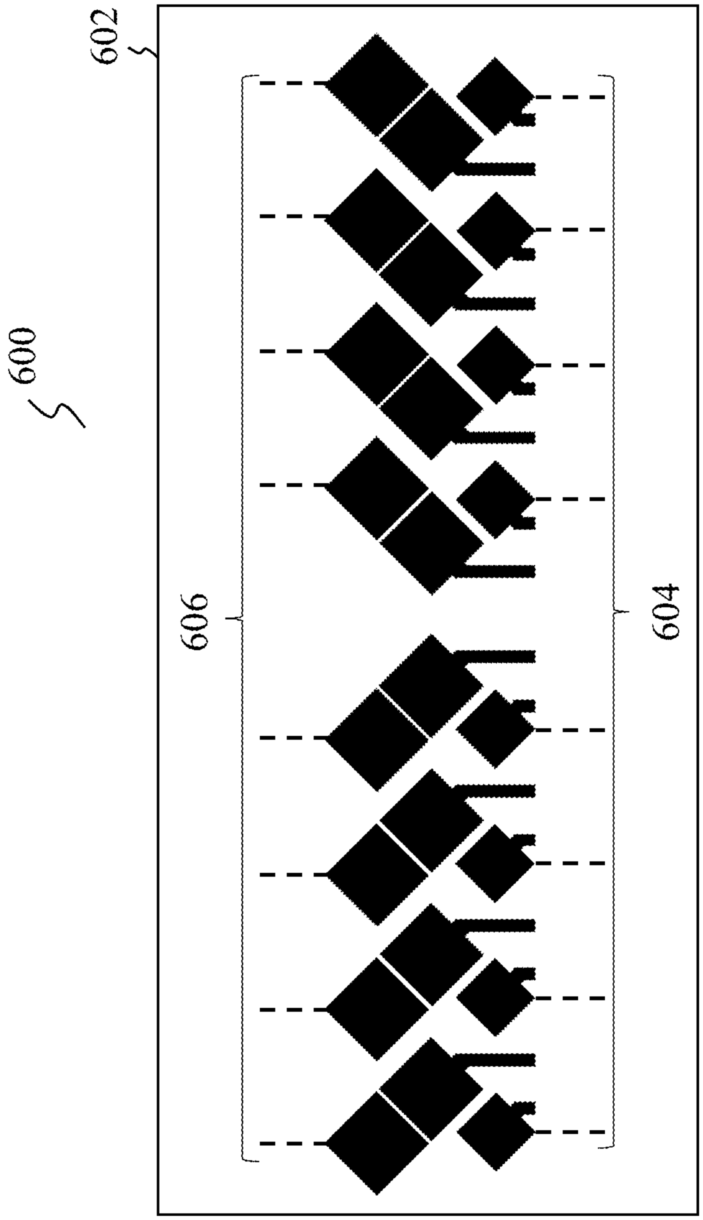
FIG. 6 shows a block diagram of a patch antenna in accordance with a third exemplary embodiment.

FIG. 6 shows a block diagram of a patch antenna 600 in accordance with a third exemplary embodiment. Similar to the patch antennas 400 and 500, the patch antenna 600 may be part of any of the above-mentioned UEs (e.g., a mobile phone). As shown in FIG. 6, the patch antenna 600 comprises the following constructive elements: a dielectric substrate 602, a first array 604 of conductive patches, and a second array 606 of conductive patches. Again, the dashed lines shown in FIG. 6 are used to show which of the conductive patches belong to which of the first array 604 of conductive patches and the second array 606 of conductive patches. More specifically, it is shown that each of the first array 604 of conductive patches and the second array 606 of conductive patches comprises eight conductive patches. The conductive patches of the first array 604 of conductive patches are implemented similar to those of the first array 404 of conductive patches, while the conductive patches of the second array 606 of conductive patches are implemented similar to those of the second array 406 of conductive patches. Similar to the patch antenna 500, the conductive patches of the first array 604 of conductive patches and the second array 606 of conductive patches are closely packed. At the same time, unlike the patch antenna 400 and the patch antenna 500, the patch antenna 600 is implemented such that one half (i.e., four left conductive patches) of the first array 604 of conductive patches is oriented in a first direction, and another half (i.e., four right conductive patches) of the first array 604 of conductive patches is oriented in a second direction that is different from the first direction. Similarly, one half (i.e., four left conductive patches) of the second array 606 of conductive patches is oriented in the first direction, and another half (i.e., four right conductive patches) of the second array 606 of conductive patches is oriented in the second direction. This means that the patch antenna 600 is configured to deal with a dual-polarized radiation.

Figure 7:
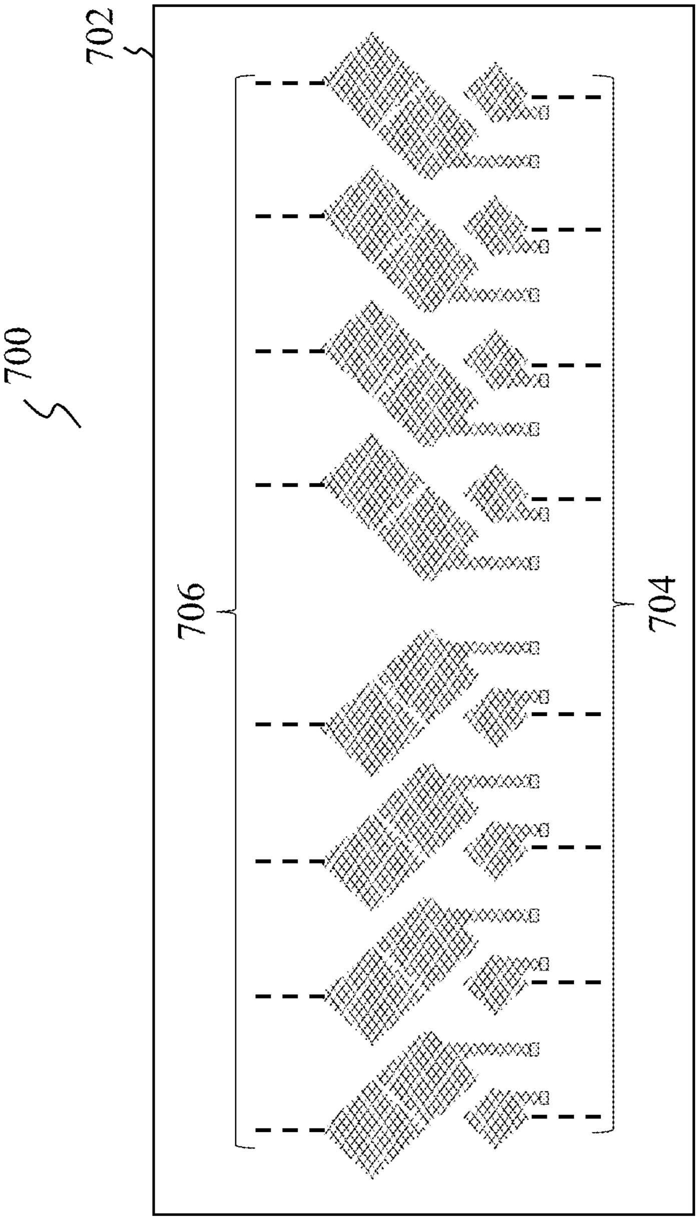
FIG. 7 shows a block diagram of a patch antenna in accordance with a fourth exemplary embodiment.

FIG. 7 shows a block diagram of a patch antenna 700 in accordance with a fourth exemplary embodiment. Similar to the patch antennas 400, 500 and 600, the patch antenna 700 may be part of any of the above-mentioned UEs (e.g., a mobile phone). As shown in FIG. 7, the patch antenna 700 comprises the following constructive elements: a dielectric substrate 702, a first array 704 of conductive patches, and a second array 706 of conductive patches. Again, the dashed lines shown in FIG. 7 are used to show which of the conductive patches belong to which of the first array 704 of conductive patches and the second array 706 of conductive patches. More specifically, it is shown that each of the first array 704 of conductive patches and the second array 706 of conductive patches comprises eight conductive patches. The arrangement of the conductive patches of the patch antenna 700 is similar to that of the patch antenna 600, meaning that the patch antenna 700 is a two-band dual-polarized patch antenna with the close-packed conductive patches. At the same time, unlike the patch antennas 400, 500 and 600, the dielectric substrate 702 is assumed to be implemented as a transparent film that is optically invisible to a UE user (e.g., the transparent film may be made of polyethylene terephthalate (PET), cyclo olefin polymer (COP), etc.), and each conductive patch of the patch antenna 700 has a mesh structure having a diamond-shaped unit cell. In some other embodiments, the mesh structure may have any polygonal-shaped unit cell, such, for example, as triangular-shaped, square-shaped, rectangular-shaped, etc., if required and depending on particular applications. The mesh structure may be made of indium tin oxide (ITO), copper, silver, etc., and have fine conductor lines which is so thin that it does not affect a user viewing experience. For example, the conductor line of the mesh structure may have both a width and thickness of about 1 μm, and the size of the unit cell may vary from 200 μm to 500 μm. Moreover, as shown in FIG. 7, the feed terminals of the conductive patches of the patch antenna 700 e.g. have a width equal to at least one unit cell of the mesh structure—this allows one to improve the antenna functionality. Due to the optically invisible dielectric substrate 702 and the meshed conductive patches, it is possible to integrate the patch antenna 702 into the UE display structure. At the same time, the size of the unit cell of the mesh structure (e.g., the diamond-shaped unit cell) is mainly determined by an optical design to avoid the so-called "moire-effect", which will occur when placing a periodical pattern over a light emitting display.

Figure 8:
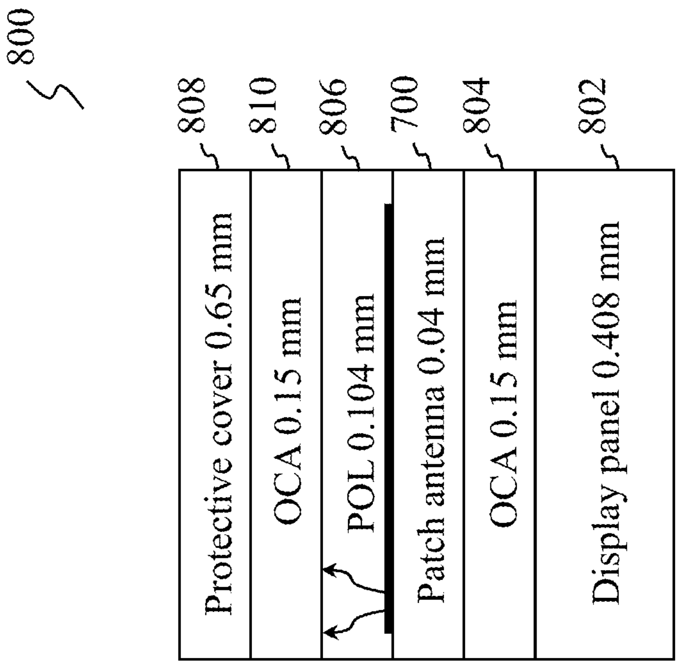
FIG. 8 schematically shows a UE display structure comprising the patch antenna shown in FIG. 7 in accordance with one exemplary embodiment.

FIG. 8 schematically shows a UE display structure 800 comprising the patch antenna 700 in accordance with one exemplary embodiment. Thus, the UE display structure 800 is an antenna-on-display design. As shown in FIG. 8, the UE display structure 800 comprises a stack of different layers formed on a display panel 802 which may be implemented based on any conventional display technology (for example, based on light-emitting diodes (LEDs), organic LEDs (OLEDs), etc.). In this embodiment, the display panel 802 serves as a ground plane for the patch antenna 700. The optically transparent dual-polarized patch antenna 700 is attached to the display panel 802 via a first optically clear adhesive (OCA) layer 804. The UE display structure 800 may optionally comprise a film polarizer 806 (e.g., a liner or circular polarizer) formed on the patch antenna 700. The film polarizer 806 may be used to block reflections from the conductor lines of the mesh structure and be transparent for the radio signals radiated (and received) by the patch antenna 700 (which are schematically shown as arrows in FIG. 8). To protect the patch antenna 700 and the display panel 802, the UE display structure 800 comprises a protective cover 808 attached to the film polarizer 806 via a second OCA layer 810. The protective cover 808 may be a cover glass, or may be made of any other material suitable, for example, for a foldable/flexible display. It should be noted that all the thicknesses of the layers, which are shown in FIG. 8, are given for illustrative purposes only and should not be construed as any limitation of the disclosure.

Figure 9:
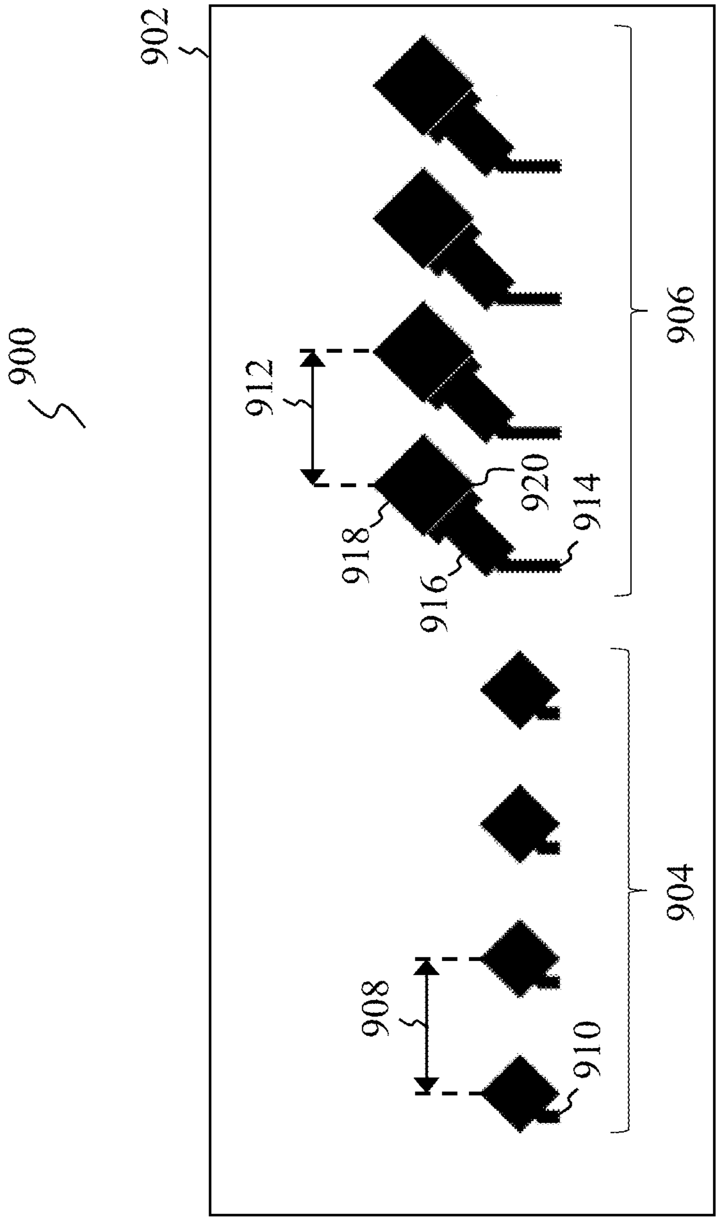
FIG. 9 shows a block diagram of a patch antenna in accordance with a fifth exemplary embodiment.

FIG. 9 shows a block diagram of a patch antenna 900 in accordance with a fifth exemplary embodiment. Similar to the patch antennas 400, 500, 600 and 700, the patch antenna 800 may be part of any of the above-mentioned UEs (e.g., a mobile phone). As shown in FIG. 9, the patch antenna 900 comprises the following constructive elements: a dielectric substrate 902, a first array 904 of conductive patches, and a second array 906 of conductive patches. The first array 904 of conductive patches and the second array 906 of conductive patches are arranged on one side of the dielectric substrate 902. The first array 904 of conductive patches has a first inter-patch spacing 908, and each conductive patch of the first array 904 of conductive patches is provided with a feed terminal 910. Similarly, the second array 906 of conductive patches has a second inter-patch spacing 912, and each conductive patch of the second array 906 of conductive patches is provided with a feed terminal 914. The first and second inter-patch spacings correspond to different frequency bands and may defined in the same or similar manner as the first and second inter-patch spacings 408 and 412, respectively. The first array 904 of conductive patches may be implemented in the same or similar manner as the first array 404 of conductive patches of the patch antenna 400. As for the second array 906 of conductive patches, each of its conductive patches also comprises a first conductive sub-patch 916 and a second conductive sub-patch 918 that is separated from the first conductive sub-patch 916 by a gap 920, but the first conductive sub-patch 916 and the second conductive sub-patch 918 are sized differently. More specifically, the first conductive sub-patch 916 has an area less than that of the second conductive sub-patch 918. This is done to ensure a good broadside radiation pattern at different frequencies of the second frequency band which is assumed to be a low-frequency band, as discussed above. The broadside radiation pattern may be considered as a radiation pattern in the direction from the conductive patches towards free space. In more detail, the first conductive sub-patch 916 is T-shaped, while the second conductive sub-patch 918 is square-shaped. At the same time, the shown shapes of the first and second conductive sub-patches 916 and 918 should not be construed as any limitation of the disclosure. If it is required to improve the broadside radiation pattern, it may be enough to make the first conductive sub-patch 916 smaller in size compared to the second conductive sub-patch 918. It should be again noted that the sizes of the first conductive sub-patch 916 and the second conductive sub-patch 918 may imply not only their areas, but also other parameters, such, for example, as diameters, lengths of a square side, etc., depending on the shapes of the conductive patches.

In one embodiment, each of the first array 904 of conductive patches and the second array 906 of conductive patches may have a mesh structure. The mesh structure may be implemented in the same or similar manner as the one discussed with reference to FIG. 7. Moreover, similar to the dielectric substrate 702, the dielectric substrate 902 may be a transparent film optically invisible to the UE user. In this embodiment, the patch antenna 900 may be integrated, for example, into the UE display structure 800 instead of the patch antenna 700. In this case, the broadside radiation pattern may be considered as a frontside radiation pattern.

Figure 10A:
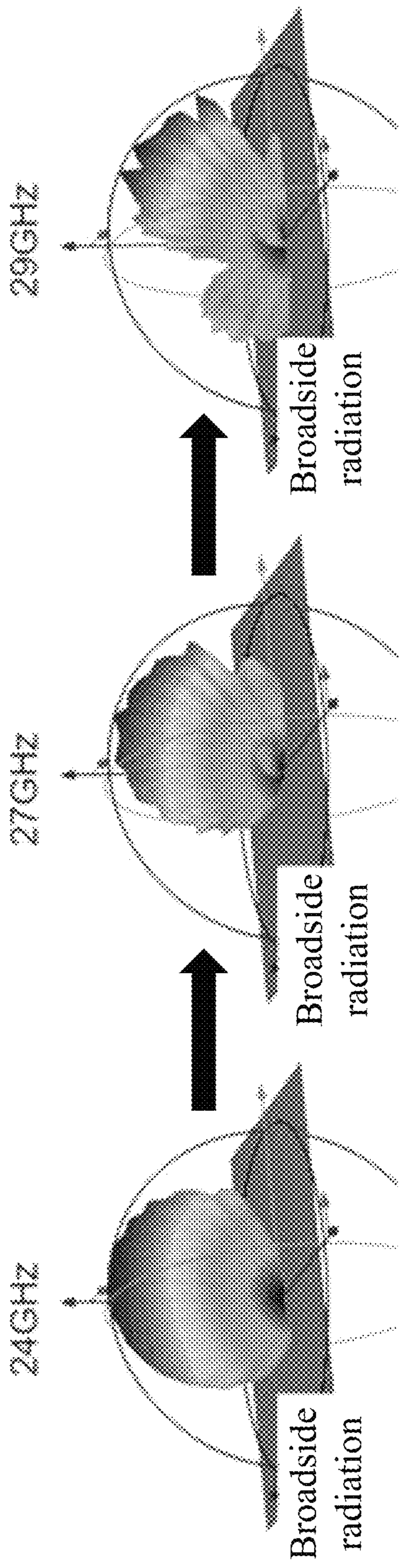
FIGS. 10A and 10B shows comparison results of broadside radiation patterns obtained by using the patch antenna shown in FIG. 4 and the patch antenna shown in FIG. 9 at three different frequencies.
Figure 10B:
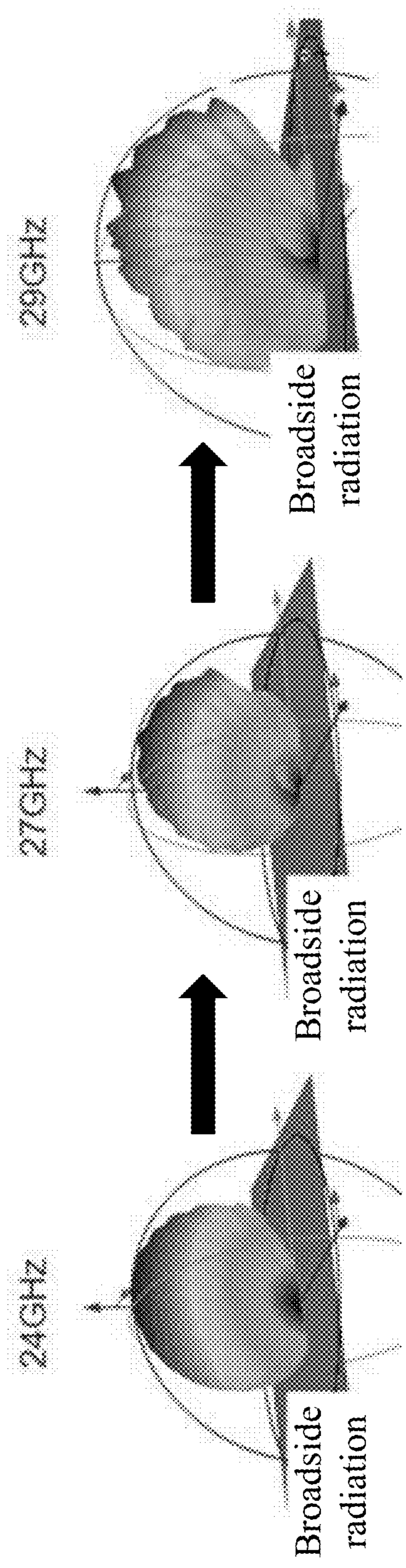

FIGS. 10A and 10B shows comparison results of broadside radiation patterns obtained by using the patch antenna 400 and the patch antenna 900 at three different frequencies (i.e., 24 GHZ, 27 HGz, and 29 GHz). In particular, FIG. 10A shows the broadside radiation patterns of the patch antenna 400, while FIG. 10B shows the broadside radiation patterns of the patch antenna 900. As shown in FIG. 10A, as the frequency increases, the broadside radiation pattern starts leaning towards a side direction which can even result to a “null” in the broadside direction at 29 GHz. As noted above, this issue may be resolved by slightly tuning of the first conductive sub-patch 916 such that it has a smaller size than the gap-coupled second conductive sub-patch 918. As can be seen from FIG. 10B, the broadside radiation patterns remain good enough as the frequency increases.

Figure 11:
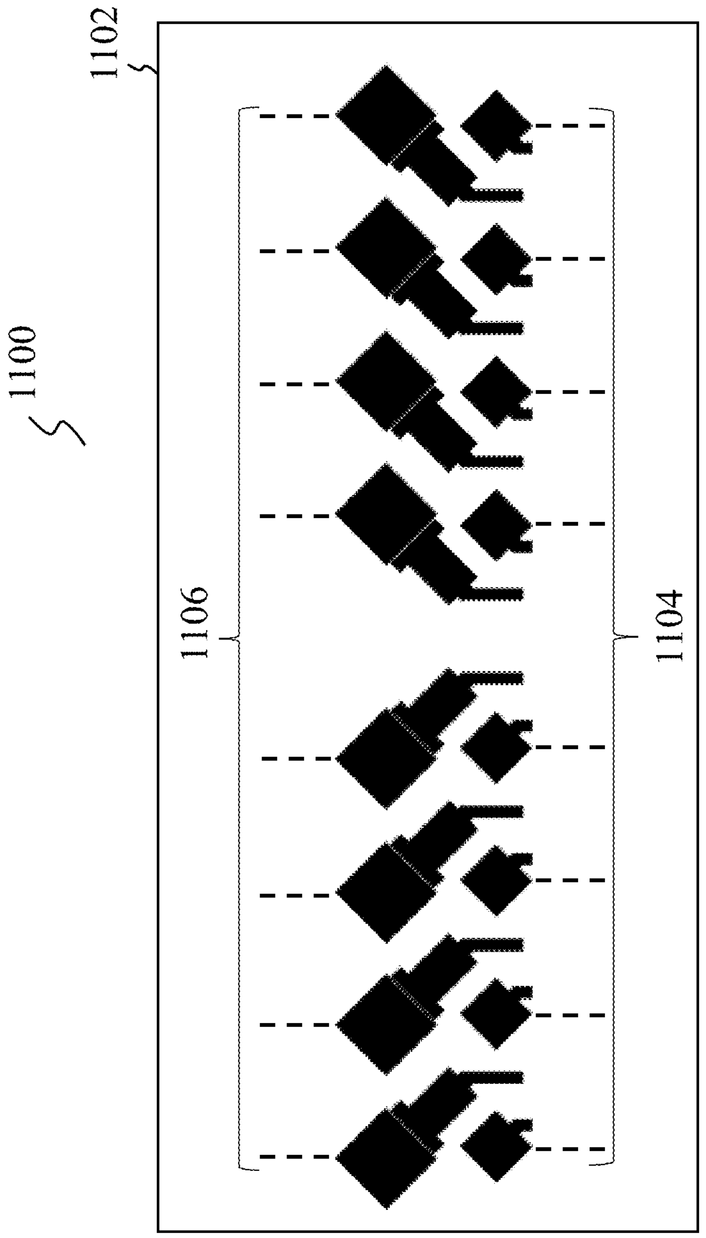
FIG. 11 shows a block diagram of a patch antenna in accordance with a sixth exemplary embodiment.

FIG. 11 shows a block diagram of a patch antenna 1100 in accordance with a sixth exemplary embodiment. Similar to the patch antennas 400, 500, 600, 700, and 900, the patch antenna 1100 may be part of any of the above-mentioned UEs (e.g., a mobile phone). As shown in FIG. 11, the patch antenna 1100 comprises the following constructive elements: a dielectric substrate 1102, a first array 1104 of conductive patches, and a second array 1106 of conductive patches. Again, the dashed lines shown in FIG. 11 are used to show which of the conductive patches belong to which of the first array 1104 of conductive patches and the second array 1106 of conductive patches. More specifically, it is shown that each of the first array 1104 of conductive patches and the second array 1106 of conductive patches comprises eight conductive patches. The conductive patches of the first array 1104 of conductive patches are implemented similar to those of the first array 404 or 904 of conductive patches, while the conductive patches of the second array 1106 of conductive patches are implemented similar to those of the second array 906 of conductive patches (i.e. they are T-shaped). The arrangement of the conductive patches of the patch antenna 1100 is similar to that of the patch antenna 600, meaning that the patch antenna 1100 is a two-band dual-polarized patch antenna with the close-packed conductive patches.

Figure 12:
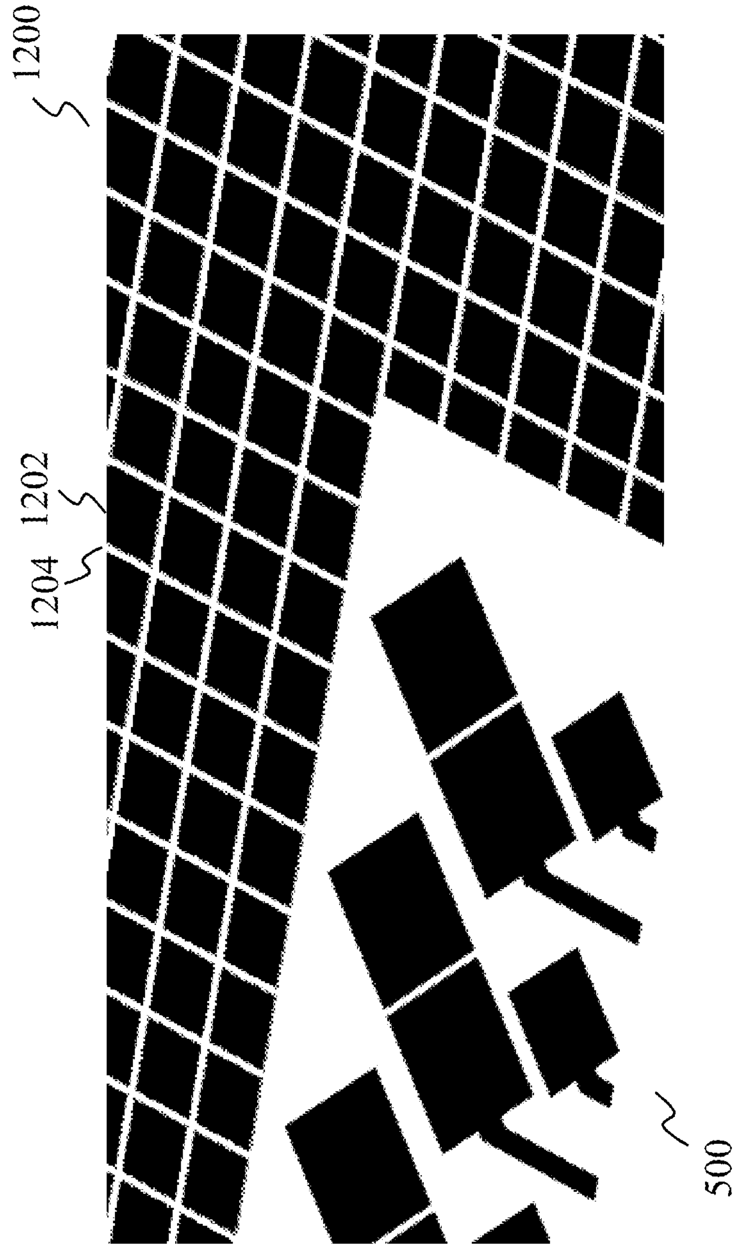
FIG. 12 schematically shows an electromagnetic bandgap (EBG) structure additionally formed on the patch antenna shown in FIG. 5 in accordance with one exemplary embodiment.

FIG. 12 schematically shows an electromagnetic bandgap (EBG) structure 1200 additionally formed on the patch antenna 500 in accordance with one exemplary embodiment. In particular, the EBG structure 1200 is arranged on the dielectric substrate 502 around the first array 504 of conductive patches and the second array 506 of conductive patches. It should be noted that the same EBG structure 1200 may be similarly formed on any of the patch antennas 400, 600, 700, 900 and 1100, and the patch antenna 500 is shown in FIG. 12 only by way of example. The EBG structure 1200 is implemented as an array of discrete square conductors 1202 which are separated from each other by a gap 1204. The size of the square conductors 1202 determines at which frequency the EBG structure 1200 functions as a high impedance surface for surface waves, thereby providing their depression and, consequently, reducing or even eliminating beam distortions. In some embodiments, the conductors 1202 may have any other polygonal shape (e.g., triangular, rectangular, etc.), or may have the same shape as the conductive patches of the patch antenna 500. In some other embodiments, the conductors 1202 of the EBG structure 1200 may have a metal mesh structure having a square unit cell. In this case, the EBG structure 1200 may be similar in the unit-cell shape to the mesh structure of the conductive patches of the patch antenna 700.

In one embodiment, any of the patch antennas 400, 500, 600, 700, 900 and 1100 may be additionally provided with a third array of array of conductive patches. Let us consider such an embodiment with reference to the patch antenna 700. The third array of conductive patches may be arranged adjacent to the first array 704 of conductive patches and the second array 706 of conductive patches on the same side of the dielectric substrate 702. The third array of conductive patches may have a third inter-patch spacing that corresponds to a third frequency band that is different from the first frequency band (e.g., from about 37 GHz to about 44 GHz) supported by the first array 704 of conductive patches and the second frequency band (e.g., from about 24 GHz to about 30 GHz) supported by the second array 706 of conductive patches. For example, the third array of conductive patches may be implemented similar to the first array 704 of conductive patches, for which reason the third frequency band may be another high-frequency band (e.g., from about 60 GHz to about 77 GHz). The third inter-patch spacing may be defined in the same manner as discussed above with reference to the patch antenna 400. Similarly, to provide the dual polarization in the third frequency band, one half of the third array of conductive patches may be oriented in the first direction, and another half of the third array of conductive patches is oriented in the second direction.

Figure 13:
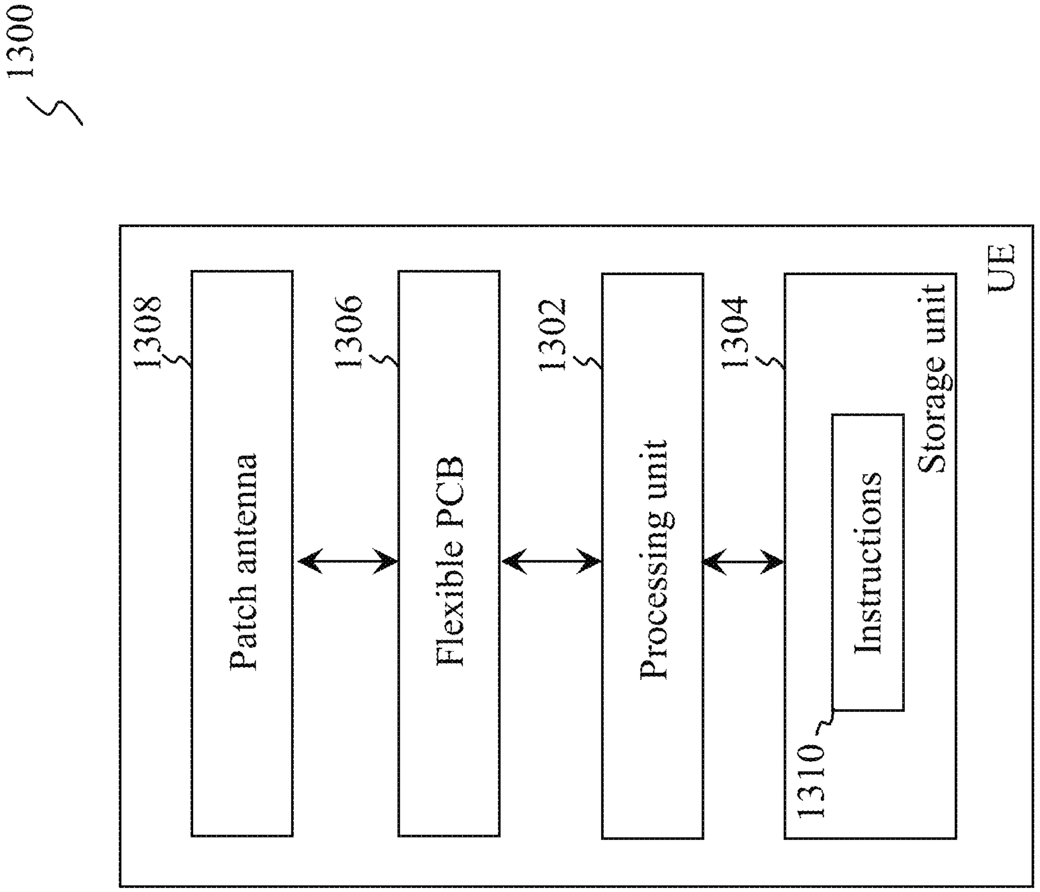
FIG. 13 shows a block diagram of a UE for wireless communications.

FIG. 13 shows a block diagram of a UE 1300 for wireless communications. The UE 1300 comprises a processing unit 1302, a storage unit 1304, a flexible PCB 1306, and a patch antenna 1308. The patch antenna 1308 may be implemented as any of the patch antennas 400, 500, 600, 700, 900 and 1100. Let us assume that the patch antenna 1308 is implemented as the patch antenna 400. Given this assumption, the flexible PCB 1306 may be configured to couple the processing unit 1302 (i.e., its RFIC input/output ports) to the feed terminals 410, 420 of the patch antenna 400, thereby provide separated feeding for each of the first array 404 of conductive patches and the second array 406 of conductive patches. The storage unit 1304 stores processor-executable instructions 1310. Being executed by the processing unit 1302, the processor-executable instructions 1310 cause the processing unit 1302 to perform wireless communications by using the patch antenna 400. It should be noted that the number, arrangement and interconnection of the constructive elements constituting the UE 1300, which are shown in FIG. 13, are not intended to be any limitation of the disclosure, but merely used to provide a general idea of how the constructive elements may be implemented within the UE 1300. For example, the UE 1300 may comprise two or more patch antennas (e.g., two or more patch antennas 500), and the processing unit 1302 may be replaced with several processing units each coupled via the flexible PCB 1306 to one of the patch antennas, as well as the storage unit 1304 may be replaced with several removable and/or fixed storage devices, depending on particular applications.

The processing unit 1302 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processing unit 1302 may be implemented as any combination of one or more of the aforesaid. As an example, the processing unit 1302 may be a combination of two or more microprocessors.

The storage unit 1304 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 1310 stored in the storage unit 1304 may be configured as a computer-executable code which causes the processor 1302 to perform wireless communications by using the patch antenna 1308 (e.g., the patch antenna 500). The computer-executable code for carrying out operations or steps for the aspects of the disclosure may be written in any combination of one or more programming languages, such as Java, C++, or the like. In some examples, the computer-executable code may be in the form of a high-level language or in a pre-compiled form and be generated by an interpreter (also pre-stored in the storage unit 1304) on the fly.

The flexible PCB 1306 may refer to a PCB comprising a metal layer of traces, usually made of copper, bonded to a flexible dielectric layer or substrate, usually made of polyimide. The metal layer of traces may be bond to the substrate by using an adhesive, but other types of bonding such as vapor deposition may be used for this purpose. Moreover, since copper tends to readily oxidize, the exposed copper surfaces may be covered with a protective dielectric layer.

Figure 14:
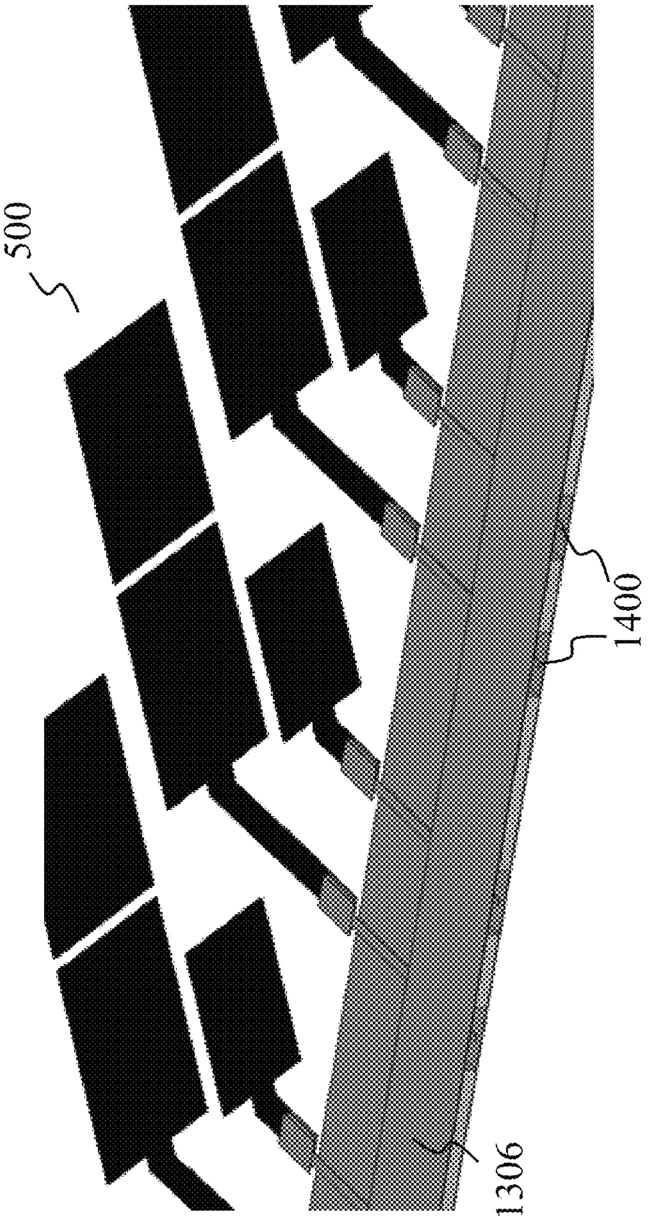
FIG. 14 schematically shows how a flexible PCB included in the UE shown in FIG. 13 may be coupled to feed terminals of the patch antenna shown in FIG. 4 in accordance with one exemplary embodiment.

FIG. 14 schematically shows how the flexible PCB 1306 may be coupled to the feed terminals of the patch antenna 500 in accordance with one exemplary embodiment. In this embodiment, the flexible PCB 1306 comprises a set of microstrips 1400 which are coupled to the feed terminals of the patch antenna 500. In another embodiment, the same coupling may provided via a set of coplanar waveguides used in the flexible PCB 1306 instead of the microstrips 1400.

Although the exemplary embodiments of the disclosure are described herein, it should be noted that any various changes and modifications could be made in the embodiments of the disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A patch antenna comprising:

a dielectric substrate;

a first array of conductive patches arranged on the dielectric substrate, wherein the first array of conductive patches comprises a first inter-patch spacing, the first inter-patch spacing corresponding to a first frequency band, wherein each conductive patch of the first array of conductive patches comprises a feed terminal; and a second array of conductive patches arranged adjacent to the first array of conductive patches on the dielectric substrate, the second array of conductive patches comprising a second inter-patch spacing, wherein the second inter-patch spacing corresponds to a second frequency band that is different from the first frequency band, and wherein each conductive patch of the second array of conductive patches comprises a first conductive sub-patch and a second conductive sub-patch that is separated from the first conductive sub-patch by, for each conductive patch of the second array of conductive patches, a gap defining a bandwidth of the second frequency band, and each of the first conductive sub-patches comprising a feed terminal.

2. The patch antenna of claim 1, wherein each conductive patch of the first array of conductive patches comprises a square shape.

3. The patch antenna of claim 1, wherein the first conductive sub-patch of each conductive patch of the second array of conductive patches comprises a first size, and the second conductive sub-patch of each conductive patch of the second array of conductive patches comprises a second size, and wherein the first size is equal to or smaller than the second size.

4. The patch antenna of claim 3, wherein the first conductive sub-patch and the second conductive sub-patch of each conductive patch of the second array of conductive patches comprise a square shape.

5. The patch antenna of claim 3, wherein the first conductive sub-patch of each conductive patch of the second array of conductive patches comprises a T shape, and the second conductive sub-patch of each conductive patch of the second array of conductive patches comprises a square shape.

6. The patch antenna of claim 1, wherein the feed terminal of each conductive patch of the first array of conductive patches comprises:

a microstrip, or a coplanar waveguide.

7. The patch antenna of claim 1, wherein the feed terminal of the first conductive sub-patch of each conductive patch of the second array of conductive patches comprises:

a microstrip, or a coplanar waveguide.

8. The patch antenna of claim 1, wherein the dielectric substrate comprises an optically transparent film, and wherein each conductive patch in each of the first array of conductive patches and the second array of conductive patches comprises a mesh structure.

9. The patch antenna of claim 8, wherein the mesh structure of each conductive patch comprises a unit cell, and wherein the feed terminal of each conductive patch of the first array of conductive patches comprises a width equal to at least one unit cell of the mesh structure, and the feed terminal of the first conductive sub-patch of each conductive patch of the second array of conductive patches comprises the width equal to the at least one unit cell of the mesh structure.

10. The patch antenna of claim 9, wherein the unit cell of each conductive patch comprises a polygonal shape.

11. The patch antenna of claim 1, wherein each conductive patch of the first array of conductive patches is arranged between two neighboring conductive patches of the second array of conductive patches.

12. The patch antenna of claim 1, further comprising an electromagnetic band-gap (EBG) structure formed on the dielectric substrate around the first array of conductive patches and the second array of conductive patches.

13. The patch antenna of claim 12, wherein the EBG structure comprises a metal mesh further comprising a square unit cell.

14. The patch antenna of claim 1, wherein the first inter-patch spacing is equal to an average half-wavelength for frequencies from the first frequency band, and the second inter-patch spacing is equal to an average half-wavelength for frequencies from the second frequency band.

15. The patch antenna of claim 1, wherein one half of the first array of conductive patches is oriented in a first direction, wherein another half of the first array of conductive patches is oriented in a second direction that differs from the first direction, wherein one half of the second array of conductive patches is oriented in the first direction, and wherein another half of the second array of conductive patches is oriented in the second direction.

16. The patch antenna of claim 15, further comprising:

a third array of conductive patches, the third array of conductive patches arranged on the dielectric substrate adjacent to the first array of conductive patches and the second array of conductive patches, wherein the third array of conductive patches comprises a third inter-patch spacing that differs from the first inter-patch spacing and the second inter-patch spacing, the third inter-patch spacing corresponding to a third frequency band that differs from the first frequency band and the second frequency band, and wherein each conductive patch of the third array of conductive patches comprises a feed terminal.

17. The patch antenna of claim 16, wherein one half of the third array of conductive patches is oriented in the first direction, and another half of the third array of conductive patches is oriented in the second direction.

18. The patch antenna of claim 16, wherein each conductive patch of the third array of conductive patches comprises a mesh structure, wherein the mesh structure comprises a polygonal-shaped unit cell, and wherein the feed terminal of each conductive patch of the third array of conductive patches comprises a width equal to at least one polygonal-shaped unit cell of the mesh structure.

19. The patch antenna of claim 16, wherein the third inter-patch spacing is equal to an average half-wavelength for frequencies from the third frequency band.

20. A device comprising:

at least one processor; and at least one patch antenna, the at least one patch antenna comprising:

a dielectric substrate;

a first array of conductive patches arranged on the dielectric substrate, wherein the first array of conductive patches comprises a first inter-patch spacing, the first inter-patch spacing corresponding to a first frequency band, and each conductive patch of the first array of conductive patches comprising a feed terminal; and a second array of conductive patches arranged adjacent to the first array of conductive patches on the dielectric substrate, the second array of conductive patches comprising a second inter-patch spacing, wherein the second inter-patch spacing corresponds to a second frequency band that is different from the first frequency band, and wherein each conductive patch of the second array of conductive patches comprises a first conductive sub-patch and a second conductive sub-patch that is separated from the first conductive sub-patch by, for each conductive patch of the second array of conductive patches, a gap defining a bandwidth of the second frequency band, and each of the first conductive sub-patches comprising a feed terminal.

* * * * *